Patented Sept. 11, 1934

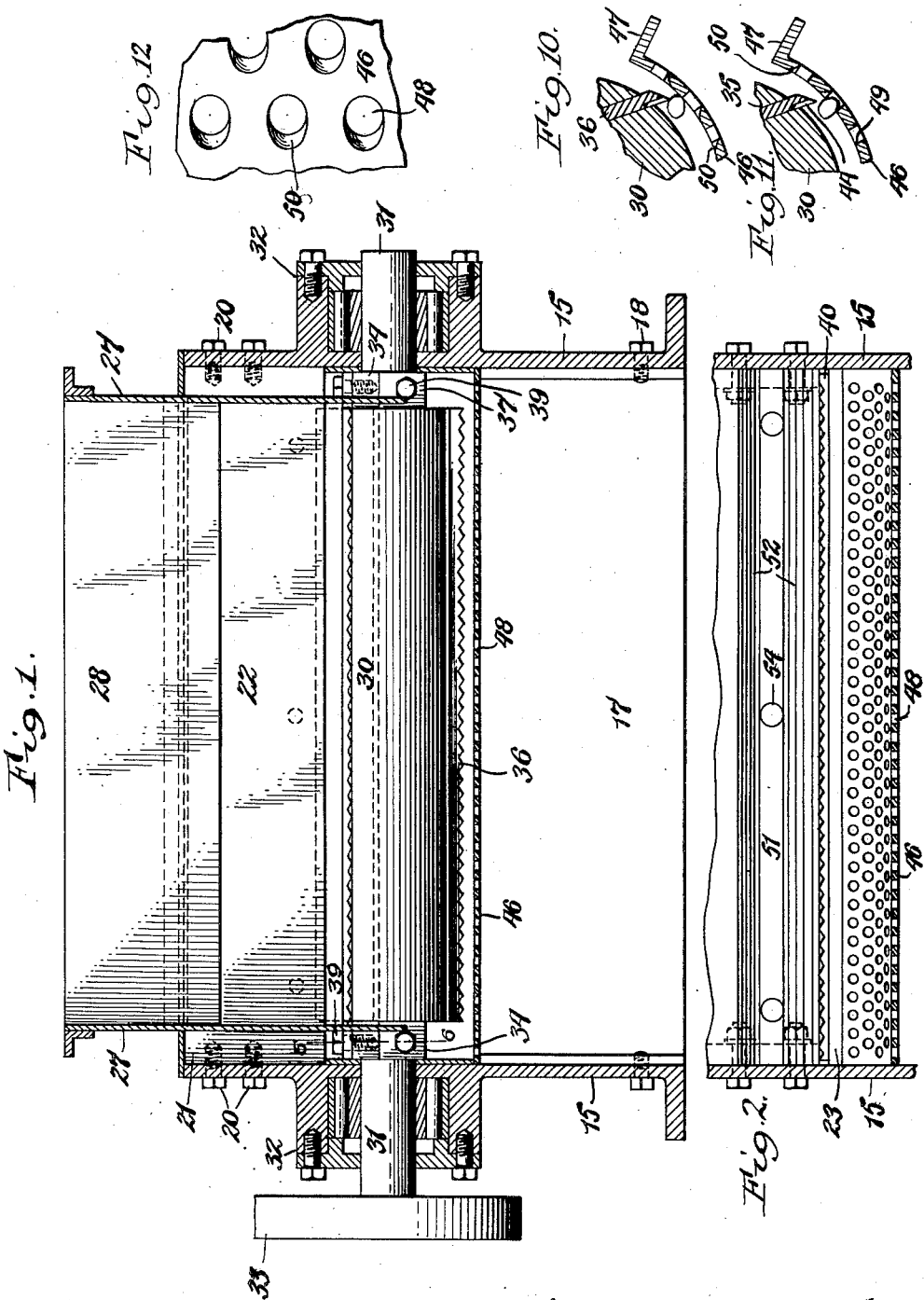

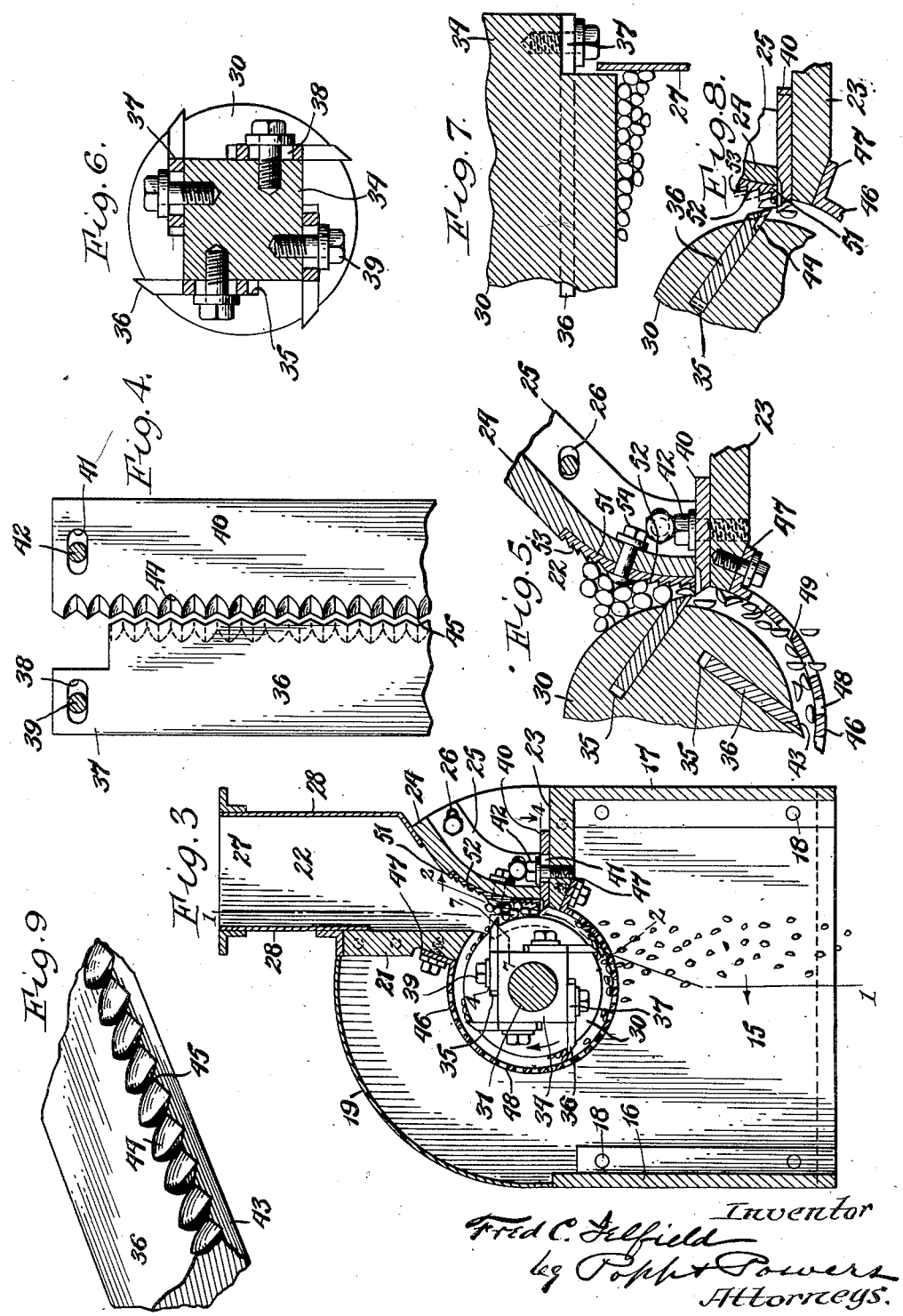

1,973,169

UNITED STATES PATENT OFFICE 1,973,169

CEREAL CUTTER

Fred C. Ielfield, Silver Creek, N. Y.

Application November 28, 1931, Serial No. 577,827

5 Claims. (Cl. 83—6)

This invention relates to a cereal cutter and more particularly for cutting corn, wheat, rye, beans, oats and all other hard cereal grains from whole kernels in the preparation of chicken and animal feed.

The principal object of this invention is to provide a cereal cutter which requires a very small amount of power to operate and which will rapidly and efficiently cut large amounts of grains to a desired uniform maximum size and in which all grinding action is avoided so that practically the entire output is of a uniform size as compared with cutters now on the market which produce a relatively large amount of very small pieces of grain and powder.

Another object of the present invention is to provide such a cutter which will handle large amounts of material and will not choke or clog up, special provision being made to prevent the grain being cut from compacting in the throat adjacent the cutting knives.

Another purpose is to provide such a cereal cutter which is readily adjustable from the exterior to provide any desired maximum size of material so that the cutter can be efficiently used in cutting small batches of grain in which different sizes are required to be produced.

Another purpose is to provide a rotary cutter head which is cylindrical in form and from the periphery of which only a small extent of the blades project. This not only prevents the rotary cutter head from becoming clogged but also prevents very substantial amounts of the partly cut grain from being carried around with the head, such carrying around being disadvantageous since it not only increases the power required to operate the rotary head but also results in a grinding action on the kernels and reduces the uniformity of the product.

A further aim is to provide a screen which, when completely worn in one position, can be reversed and provide a completely renewed, effective screening surface. By this means the life of the screen is doubled.

Another purpose is to effect a similar provision in the means for preventing choking of the uncut grain at the throat of the cutter, this means comprising a grooved or serrated plate which when worn can be reversed so as to provide a complete new wearing surface.

Another object is to provide cutter knives having a serrated edge but in which the serrations of the stationary blade and the rotary blades interfit so as to insure uniformity of the product. The provision of such serrated blades not only greatly increases the efficiency of the cutter but also greatly reduces the power necessary to operate it.

Other purposes are to provide such a cutter in which there is no danger of uncut or oversize grain passing through the machine; is entirely adjustable throughout; can be readily taken apart and cleaned or repaired; provides no space for the accumulation of material; is extremely simple and inexpensive in construction and will operate at high efficiency for a long period of time and under adverse conditions without getting out of order or requiring resharpening or replacement of any of the elements.

In the accompanying drawings:

Figure 1 is a vertical, longitudinal section, taken on line 1—1, Fig. 3, through the grain cutter embodying my invention.

Figure 2 is a similar fragmentary section taken on line 2—2, Fig. 3.

Figure 3 is a vertical, transverse section through one end of the grain cutter.

Figure 4 is a fragmentary, horizontal section taken on line 4—4, Fig. 3, and showing the relation of the stationary and movable cutting knives.

Figure 5 is a fragmentary, vertical, transverse section showing the action of the knives and other elements in cutting grain.

Figure 6 is a cross section through one end of the rotary cutter head, this section being taken on line 6—6, Fig. 1.

Figure 7 is a fragmentary, horizontal section taken on line 7—7, Fig. 3, and showing the manner in which the ends of the rotary cutter are enclosed to prevent the leakage of oversize particles of grain.

Figure 8 is a fragmentary view similar to Fig. 5 and showing the manner of adjusting the blades.

Figure 9 is a fragmentary, perspective view of one of the cutting blades.

Figure 10 is a view similar to Figs. 5 and 8 and showing the manner in which screen wears in service.

Figure 11 is a view similar to Fig. 10 showing the worn screen reversed and in a condition for further service.

Figure 12 is a top plan view of the worn screen shown in Fig. 10 and showing it in condition to be reversed for further use.

Similar reference numerals refer to similar parts in each of the several views.

While the form of the cutter can be varied greatly as to detail, as shown in the drawings, the invention is applied to a grain cutter having end heads 15 to which side plates 16 and 17 are secured in any suitable manner as by providing flanges on the side plates 16 and 17 and securing these to the end heads 15 by screws 18. The upper ends of the end heads 15 are rounded and carry a sheet metal cover 19 which rises from the side plate 16 and terminates near the top. To the end heads are also secured by screws 20 or in any other suitable manner a cross bar 21 which extends downwardly from the upper end of the top 19 and forms one wall of a hopper 22. The wall 18 is formed at its upper end to provide an inwardly extending shelf 23 which, as hereinafter described, carries the stationary cutting blade and above this shelf is arranged a curved plate 24 having end flanges 25. These flanges are provided with slots 26 through which the flanges 25 are adjustably secured to the end heads 15 and this plate forms one wall of the throat of the hopper 22. The hopper 22 includes a sheet metal structure having end walls 27 and side walls 28 and 29. The side wall 29 fits against the bar 21, the side wall 29 rests against the adjustable plate 24, and the end plates 27 extend downwardly past the throat of the cutter, as hereinafter described, so as to prevent the leakage of oversize grain particles past the rotary cutter at this point. The rotary cutter includes a cylindrical rotary cutter head 30 having reduced ends 31. These reduced ends 31 are journaled in roller bearings 32 provided in the end heads 15 which roller bearings are preferably so constructed that they can be packed with grease. To one of the trunnions 31 is secured the usual pulley 33 which is connected to a power source by a belt (not shown). Between the cylindrical head 30 of the rotary cutter and the trunnions 31 the cutter is formed to provide two squared portions 34. As best shown in Fig. 6, the cylindrical portion 30 of the cutter head is provided with comparatively deep slots 35, four of such slots being provided and the slots being so arranged that the inner wall of each is co-planar with the corresponding faces of the squared portions 34 at each end of the cutter. The moving cutter blades 36 fit into these slots 35 and also are arranged flat against the corresponding faces of the squared portions 34 at each end of the cutter. For this purpose each of the cutter blades 36 is provided at each end with an extension 37 having a transverse slot 38. An adjusting screw 39 extends through each of these slots 38 and screws into threaded holes provided in the squared end portions 34 of the cutter. By this means it is apparent that upon loosening the four screws 39 at each end of the rotary cutter all of the blades 36 can be adjusted inwardly or outwardly to vary the size of the granular material produced by the cutter. It is also apparent, as best shown in Fig. 5, that the effective part of the cutter head is cylindrical in form and is broken only by the slight extension of the cutter blades out from the cylindrical portion 30. By this means the tendency of the cutter head to pick up and idly carry around a large quantity of partly cut or uncut grain is greatly reduced since the only impellers provided are the comparatively small extensions of the blades 36.

The cutting edges of the rotary blades 36 cooperate with an adjustable stationary blade 40. This adjustable stationary blade rests flat upon the upper surface of the shelf 23 and is provided at each end with a transverse slot 41 through which a screw 42 passes and screws into a threaded hole at the corresponding end of the shelf 23. It is apparent that upon loosening each of the screws 42 the stationary blade 40 can be adjusted inwardly or outwardly to follow the blades 36 as they are adjusted inwardly and outwardly. It will be understood that the size of the grain when cut is determined by the extent to which the movable cutter blades 36 are adjusted inwardly or outwardly and not by the gap between the rotary blades 36 and the stationary blade 40. Thus, upon reference to Fig. 8, it is apparent that upon adjusting the rotary blades 36 inwardly to the dotted line position a much smaller cut will be taken off from the grain than when it is adjusted outwardly to the full line position shown in the said figure. The stationary blade 40, however, must also be adjustable since it is desirable to have the gap between the blades as small as possible. The rotary blades are therefore adjusted to provide the desired size of the comminuted material and the stationary blade 40 is brought up to provide the desired spacing between it and the rotary blades.

Instead of employing a straight cutting edge on each of the rotary and stationary blades 36 and 40 the cutting edge of each of these blades is preferably serrated and indented, as best shown in Fig. 9. In providing such a cutting edge one longitudinal side of the blade is first beveled, as indicated at 43. The face of the blade adjacent the sharper edge formed by this bevel 43 is then formed to provide a plurality of notches 44 which are V-shaped in cross section and arranged one after the other the full length of the cutting edge. With the blade formed in this manner it is apparent that in plan the cutting blades are provided with a plurality of V-shaped teeth 45 of regular form and that these teeth are also V-shaped when viewed edgewise of the knife. These teeth, therefore, have sharp cutting points and provide a serrated edge. The stationary cutting knife 40 is arranged with the sharp points of its teeth extending upwardly and the rotary knives 36, during their effective movement past the stationary cutting knife 40 have their cutting points facing downwardly. The points of the stationary and rotary cutting knives preferably are arranged in intermeshing relation, as best shown in Fig. 4, so that the space between the rotary and stationary cutting knives is of zig-zag form of uniform width.

The rotary cutter is embraced by a screen 46 which is generally of semi-cylindrical shape and is provided at its opposite longitudinal edges with flanges 47. These flanges are secured, respectively, to the lower end of the cross bar 21 and to the underside of the shelf 23 by screws or in any other suitable manner. The screen is made of sheet metal which is punched to provide a plurality of evenly spaced round perforations 48. As the screen is in use the grain passing through the screen wears the opposing corner 49 of each of the perforations 48 so as to wear a groove 50 on one side only of each of the perforations, as best shown in Figs. 10 and 12. When the screen is badly worn in this manner the screen can be removed and reversed end for end. In doing this the grooves 50 formed by the wearing away of the corners 49 are also reversed so that the opposite unworn side of each perforation 48 is presented as the new wearing corner. In this manner the life of the screen is doubled by one reversal thereby greatly decreasing the cost of upkeep of the cutter since the screen forms a rapidly wearing element of the combination. As previously explained, the side walls 27 of the hopper 22 extend downwardly and are disposed alongside the cylindrical part 30 of the rotary cutting head. By this means leakage of whole or only partly cut grain past the ends of the cylindrical part 30 of the cutter head is prevented. It will also be noted that while a small amount of grain is carried around, ineffectively, by the cutter blades the grain so carried about is very small in amount because the cutter head is cylindrical in form and the spacing between this cylindrical part 30 of the cutter head and the screen 46 is very small. By this means the churning of large amounts of grain in idly passing around with the cutter head is avoided and the consequent grinding action upon this grain is avoided. In cutting very large sized material, this screen can be eliminated, however.

It has been found highly desirable to provide some means to retard the flow of the uncut grain into the throat of the cutter. The impacting of grain in the throat not only greatly increases the amount of power required to rotate the cutter head but also results in a grinding action on the grain at this place. To avoid this, a curved plate 51 is set into the power part of the adjustable plate 24 at the throat of the hopper 22. This plate is formed at each side to provide a series of teeth 52, these teeth being of saw tooth form and extending the full length of the retarding plate 51. The abrupt faces 53 of the series of teeth on one side of the plate 51 oppose the abrupt faces of the series of teeth on the opposite side of this plate and the abrupt faces 53 of the teeth on the lower side of the plate 51 face upwardly or in opposition to the movement of the rotary cutter head. By this means it is apparent that the abrupt faces of the lower series of teeth support and hold the uncut grain up, as best shown in Fig. 5, and serve to retard the jamming of the grain into the restricted throat of the hopper. The plate 51 is held in position by a plurality of bolts 54 which extend through the plate 24 and when the lower series of teeth of this retarding plate become worn it can be removed and reversed end for end so that the upper unworn teeth 52 of this plate become the lower operative teeth. By this means the effective life of the plate 51 is, of course, doubled. The plate 24, as previously described, is made adjustable toward and from the rotary cutter so as to vary the effective side of the throat through which the grain must pass before cutting and also to secure the maximum effectiveness of the retarding plate 51 with the particular side of grain being cut.

From the foregoing it is apparent that grain from the hopper 22 passes down into the throat of this hopper and is supported against jamming by the teeth of the retarding plate 51. The rotary knives then engage the grain resting upon the stationary knife 40 and cut off a slice or piece of each grain, the size of this slice or piece being determined by the degree to which the rotary knives 36 are adjusted outwardly. Since both the stationary and rotary knives are formed to provide sharp serrated teeth this cutting is effected with the expenditure of very little power. The cut pieces or slices of grain thereupon pass down into the screen 46 and if sufficiently small are carried past through the perforations in this screen. Since the teeth of the cutting knives are serrated in form and intermesh with one another it is apparent that practically all of the grain will be cut to a maximum size and will pass through the screen. Such small quantities as are not cut to this maximum size are carried around by the rotary knives and brought back into the hopper 22. This is a very small quantity, however, and by reason of the cylindrical form of the rotary cutter head there is no tendency for this partially cut grain to collect in the rotary cutter and be carried around and around until it is ground down to the required maximum size as would be the case if the rotary cutter head were not cylindrical.

It is apparent that the present invention provides a very simple and inexpensive grain cutter which operates at very high efficiency and requires a very small amount of power to run. The grain is also uniformly cut to a maximum size and is also uniformly graded. The cutter also avoids, as far as possible, all grinding action upon the grain. Means are provided to prevent choking of the throat of the cutter in use and the blades are so formed that they provide the most efficient manner of cutting the grain to a uniform size. The machine is also conveniently and easily adjustable thereby adapting it to small batch work. It is easily cleaned and repaired, and as far as possible the wearing parts are made reversible so that their life is doubled. The cutter is also extremely compact and at the same time will handle large quantities of grain.

I claim as my invention:

1. A cereal cutter, comprising a frame, a substantially cylindrical rotary head having reduced ends projecting outwardly from said head and journaled in said frame, the enlarged central part of said head being provided with at least one slot running parallel with the axis thereof, a blade arranged in said slot, means for securing the ends of said blade exclusively to the reduced ends of said head, a stationary cutter cooperating with said blade, said stationary blade being arranged to support the cereal to be cut on its upper face, means for adjusting said stationary blade toward and from the axis of said rotary head, the adjustment of said stationary blade determining the size of the cut cereal and means for feeding the cereal to be cut between said blade and cutter.

2. A cereal cutter, comprising a frame, a substantially cylindrical rotary head having outwardly projecting reduced ends forming trunnions at their extremities and each being provided with a flat face intermediate the corresponding trunnion and the enlarged cylindrical part of said head, and said enlarged cylindrical part of said head being provided with a slot running parallel with the axis thereof, a blade arranged in said slot and having its cutting edge extending outwardly from the periphery thereof, means for adjustably securing the ends of said blade exclusively to the corresponding flat faces adjacent said trunnions whereby said cutting edge can be adjusted inwardly and outwardly from said cylindrical part of said head, means journalling said trunnions in said frame, a stationary cutter cooperating with said blade and means for feeding the cereal to be cut between said blade and cutter.

3. A cereal cutter, comprising a frame, a hopper carried by said frame and having a contracted lower end provided on one side with an outlet opening, cereal cutting means arranged adjacent said outlet opening to cut the cereal passing therethrough, comprising a rotary cutter at one side of said outlet opening, a stationary cutter mounted at the opposite side of said outlet opening and means for adjusting said stationary cutter toward and from the axis of said rotary cutter, and means to prevent the compacting of the cereal in said contracted part of said hopper, comprising a series of teeth provided on the wall of said hopper above said stationary cutter, said teeth opposing the flow of said cereal and means for adjusting said teeth, as a group, toward and from said stationary cutter independently of the adjustment of said stationary cutter.

4. A cereal cutter, comprising a frame, a hopper carried by said frame and having a gradually contracting neck at its lower end which neck is provided with an outlet opening, cereal cutting means arranged adjacent said opening to cut the cereal passing therethrough, and means to prevent the compacting of the cereal in the gradually contracting neck of said hopper, comprising a plate, means for removably fastening said plate to one wall of said hopper, said plate being provided on its upper side with one series of teeth and on its lower side with another series of teeth, the teeth of both series being of sawtooth form, the abrupt faces of which oppose one another whereby the abrupt faces of the lower series of teeth oppose the flow of cereal through said neck, said plate being reversible, in position, end for end, whereby after the lower series of teeth become worn, the plate can be reversed to reverse the relation of said upper and lower series of teeth.

5. A cereal cutter comprising a frame, a high speed cylindrical cutter head carried by said frame to rotate about a horizontal axis, means for feeding the cereal to be cut to one side of said rotary cutter head, a horizontal cutting blade carried by said frame on the same side of said cutter head below said feeding means and forming a shelf supporting the uncut cereal, the horizontal cutting edge of said blade projecting toward said head, means for adjusting said stationary blade toward and from said head, a plurality of longitudinal blades projecting directly outwardly from the periphery of said head a distance less than the diameter of the cereal being cut thereby to cut slices from the cereal supported on and overhanging said shelf, and the cylindrical periphery of said head preventing the passage of uncut cereal, a curved screen carried by said frame under said rotary head, said screen being closely spaced from said head and extending from said stationary blade back to said feeding means to form a relatively small unobstructed passageway for quickly effecting the return of non-screenable cereal to said feeding means thereby to avoid churning of the cereal between the rotary blades and the screen.

FRED C. IELFIELD.